2,580,678

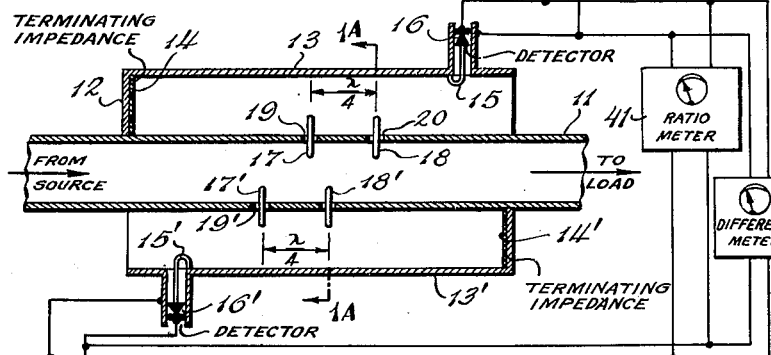
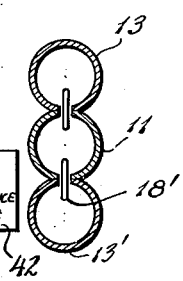
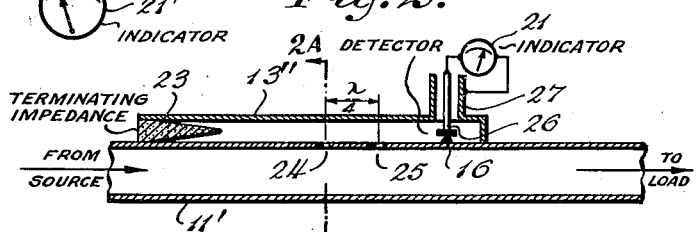
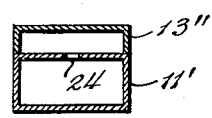
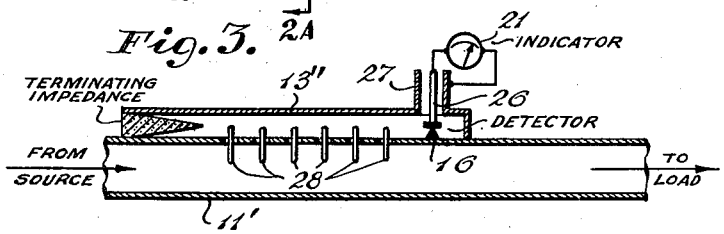
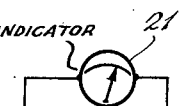
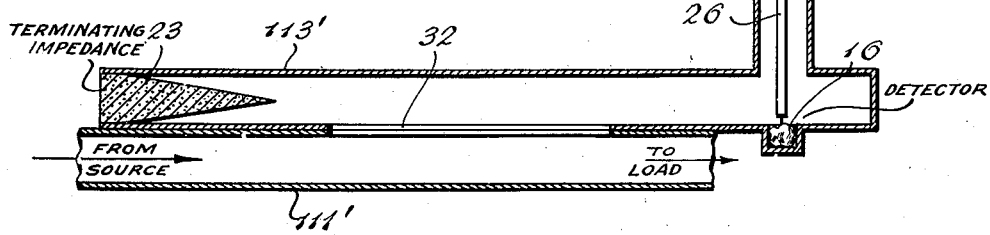
INVENTOR
WILLIAM W. HANSEN
THEODORE MORENO
ATTORNEY Patented Jan. 1, 1952

UNITED STATES PATENT OFFICE 2,580,678

HIGH-FREQUENCY MEASURING APPARATUS

William W. Hansen and Theodore Moreno, Garden City, N. Y., assignors to The Sperry Corporation, a corporation of Delaware Application September 17, 1943, Serial No. 502,734

3 Claims. (Cl. 171—95)

The present invention pertains to the art including devices adapted for use with ultra high frequency energy and, more particularly, relates to such devices responsive to the direction of energy flow, such as are useful for measuring and/or indicating the power flow or standing wave ratio in an ultra high frequency energy conductor.

In prior copending application Serial No. 499,072, for High Frequency Measuring Apparatus, filed August 18, 1943, in the name of William W. Hansen, now abandoned, there is shown one form of ultra high frequency energy device using a direction-responsive apparatus and adapted to measure separately the power flowing in an ultra high frequency conductor to, or reflected from, a load device. In this prior application is also shown apparatus for indicating directly the standing wave ratio in an ultra high frequency energy conductor. Such measuring devices have the great advantage that their indication is independent of their position along the energy conductors, and is not affected by standing waves therein, permitting direct and continuous monitoring, in contrast to prior art devices, whose indications may differ greatly according to the location along the conductor, because of standing waves.

The present invention comprises improvements in ultra high frequency apparatus of the type disclosed in this prior copending application. More specifically, the present invention contemplates adapting the invention in the prior application to ultra high frequency energy conductors of the wave guide type, and is further directed toward providing decreased frequency sensitivity for such devices, while retaining all the advantages thereof.

Accordingly, it is an object of the present invention to provide improved apparatus responsive to the direction of energy flow along an ultra high frequency conductor.

Another object of the present invention is to provide improved apparatus for measuring or monitoring the ultra high frequency power flow to a utilization device or the power reflected from such a device.

It is a further object of the present invention to provide improved ultra high frequency apparatus for measuring or monitoring the power flow in the wave guide or other high frequency energy conductors, travelling in a predetermined direction.

It is another object of the present invention to provide improved apparatus for directly indicating and monitoring the standing wave ratio and power transmission efficiency of an ultra high frequency energy conductor.

It is a further object of the present invention to provide improved apparatus of the above type and of the type disclosed in the above-mentioned copending application, and having decreased frequency sensitivity.

Other objects and advantages of the present invention will become apparent from the following specification and drawings, wherein Fig. 1 shows a schematic longitudinal cross-sectional view of one form of the present invention.

Fig. 1A shows a longitudinal cross-sectional view of the device of Fig. 1 taken along line 1A—1A thereof.

Fig. 2 shows a similar schematic longitudinal cross-sectional view of a modified form of the present invention.

Fig. 2A shows a cross-sectional view of the device of Fig. 2 taken along the line 2A—2A.

Fig. 3 illustrates a similar schematic longitudinal cross-sectional view of another form of the present invention.

Fig. 4 illustrates a longitudinal cross-sectional view of a preferred form of the present invention.

Referring to Fig. 1, there is shown an ultra high frequency energy conductor 11, illustrated as being of the circular wave guide type. Energy is supplied to the wave guide 11 from a suitable source connected at its left, while a suitable load or utilization device is to be understood as being connected to the right end of conductor 11.

For the purpose of measuring the power flow from the source toward the load, and independent of any power reflected by the load, a second or auxiliary wave guide 13 is positioned along and adjacent to wave guide 11. Guide 13 preferably has the same propagation constant as guide 11. The guide 13 is terminated at its left end by a suitable terminating impedance which may comprise an insulating disc 12 with a resistive coating 14 producing a desired impedance, so as to prevent reflection of energy incident upon this end of the guide 13. At the other end of this guide 13 is located a suitable detector, or rectifier, indicated schematically as the crystal detector 16, coupled to guide 13 by loop 15.

The guide 13 is excited by a pair of probes or antennae 17, 18, extending through and suitably insulatingly supported in openings 19, 20 in the adjoining walls of wave guides 11 and 13. Preferably probes 17, 18 are spaced substantially one-quarter wavelength apart within guide 11, at the operating frequency, so as to be excited in substantially 90° phase relation.

Energy flowing from left to right in guide 11 will excite coupling antennae 17, 19 in 90° phase relation. Antennae 17 and 18 then tend to set up waves travelling in both directions in guide 13. However, the leftward wave in guide 13 excited by antenna 17 is 180° out of phase with respect to that excited by antenna 18, so that these waves cancel and no resultant leftward wave is produced in guide 13. The rightward waves excited by antennae 17 and 18 reinforce, and energy travels down guide 13 to loop 15. The right end of guide 13 may be terminated in an energy sink or load, or may radiate its energy into space, preferably without reflection, so that no standing waves are produced therein.

Energy flowing from right to left in guide 11 will similarly excite only a leftward wave in guide 13. This wave is terminated by impedance 12, 14 and has no effect on detector 16. Accordingly, guide 13 will be energized only by high frequency energy moving from left to right in the wave guide 11, and will not respond in any manner to energy travelling in the other direction in wave guide 11.

Detector 16 is connected to a suitable meter or indicator 21, whose deflection thereby indicates the amplitude of the incident or rightward flowing power in wave guide 11. If detector 16 is of the square law type, indicator 21 may be calibrated directly in power. If detector 16 is of the linear type, indicator 21 may be calibrated directly in voltage or electric field intensity within the guide 11. For other types of detector, indicator 21 may be suitably calibrated to give desired indications.

If the energy flowing in guide 11 is modulated, indicator 21 need not be a D.-C. meter, but may be any indicator adapted to indicate the amplitude of the modulated signal, which is a measure of the power flow.

It will be understood that a similar type of apparatus may be utilized to measure the reflected power merely by interchanging the terminating impedance 14 and the detector 16. This is also shown in Fig. 1, the corresponding parts being given identical reference characters to those described above, but now primed.

Also, if desired, both the incident power and the reflected power may be indicated simultaneously. In such a case a single indicator may replace the separate indicators, 21 and 21', and if this indicator is of the ratio meter type, as illustrated at 41 in Fig. 1, adapted to indicate the ratio of its input voltages, the ratio of incident to reflected power in the system, which is a direct function of the standing wave ratio, can be indicated directly, thus rendering the system very useful for monitoring purposes. Also, a single indicator 42 adapted to indicate the difference between the detector outputs may be used, so that the power actually dissipated in the load may be indicated.

Fig. 2 illustrates a modification of the system of Fig. 1, in which the main energy conductor is shown in the form of a rectangular wave guide 11'. An auxiliary rectangular wave guide 13" preferably having the same propagation constant as guide 11' and extending along the guide 11", is utilized here. Wave guide 13" is suitably terminated at one end, such as the left end, by a terminating impedance 23 which may be formed as a gently tapering wedge of semi-conducting material adapted to dissipate the energy travelling from right to left in the wave guide 13". If the termination 23 is made fairly long compared to one wavelength, substantially no reflection of this leftward travelling energy will be produced within the wave guide 13".

Wave guide 13" is excited from guide 11" by a pair of openings 24, 25 spaced one-quarter-wavelength along the guide 11'. In this manner, in response to energy travelling from left to right within the main guide 11', energy will be excited within auxiliary wave guide 13" travelling only from left to right. Energy travelling from right to left within the main guide 11' will be ineffective to produce any rightward-travelling energy in the auxiliary wave guide 13", since it will produce substantial cancellation at opening 25, and no reflections are produced by impedance 23, similarly to Fig. 1.

This rightward-travelling energy in wave guide 13" is rectified by the detector 16 connected to the indicator 21 by a transmission line section 26, 27. Detector 16 may be located within auxiliary guide 13", as shown schematically in the figure. In this way indicator 21 will again indicate the rightward power flow in wave guide 11'.

By interchanging the positions of the terminating impedance 23 and the detector 16, the device may be made responsive solely to the reflected power, as in the prior modification. Also, by use of the ratio meter, as described above, the standing wave ratio or power transmission efficiency or ratio of incident to reflected power may be indicated directly or monitored. By use of a difference meter, the actual power delivered to the load may be indicated.

It will be understood that antennae similar to 17, 18 may be used in Fig. 2, or the single openings 24, 25 of Fig. 2 may be used in Fig. 1. If desired, coupling loops similar to 15 may be used in place of either holes 24, 25 or antennae 17, 18.

The devices of Figs. 1 and 2, while constituting improvements over that of the above-mentioned prior application, in being adapted for use with wave guides and hence with higher frequencies, are still sensitive to frequency variations within guide 11 or 11'. In order to avoid such frequency sensitivity, a plurality of such couplings extending over a distance long in comparison with a wavelength may be used. A plurality of such coupling antennae 28 is shown in Fig. 3.

By using a plurality of such couplings suitably spaced apart and extending for a distance of several wavelengths within guides 11 and 22, the device is made to improve its directional sensitivity, that is, to respond only to high frequency energy travelling in a predetermined direction in the wave guide 11', and is also made relatively insensitive to changes in the operating frequency. In this way, the critical dimensions necessary for the spacing of antennae 17, 18 of Fig. 1 or openings 24, 25 of Fig. 2 are no longer present in the device of Fig. 3. Preferably the antennae of Fig. 3, or their equivalent couplings, are spaced closer than one-half wavelength within guide 11'. Any suitable number may be used, the larger numbers being preferred.

Fig. 4 illustrates a practical embodiment of the present invention in which, in place of the plurality of antennas 28, a single elongated opening 32 between the wave guides 113' and 111' is provided. Opening 32 is preferably several wavelengths long within guides 111' to provide good frequency insensitivity and directional sensitivity and is fairly narrow in width, in order not to unduly distort the electromagnetic fields within the respective wave guides.

It will be understood that a similar long slot may be used between two concentric transmission lines, to indicate power flow in one of them in the same manner as in Fig. 4.

Fig. 4 also illustrates a filter for preventing leakage of high frequency energy from the crystal detector and the connection to the indicator, which may be utilized in any of the preceding modifications also. Thus, in Fig. 4 the inner conductor 26 of the coaxial line 26, 27 is connected directly to the crystal 16, at one end, and to a low pass filter at the other end. For this purpose the conductor 26 is connected to an enlarged section 33 which is made substantially one-quarter wavelength long and is succeeded by a relatively small diameter inner conductor section 36 also of one-quarter wavelength. This in turn is followed by a quarter-wave section 37 of relatively large diameter, all of these sections being insulated from the outer conductor 27. This succession of alternating large and small diameter sections of inner conductor may be extended as far as necessary, and provides a succession of alternately small and large impedance quarter-wave transmission line sections, which, as is well known, serve as an impedance transformer to provide a greatly decreased impedance to high frequencies at the gap between section 33 and conductor 27. Indicator 21 is then connected between the outer conductor 27 and the last inner conductor section 37. Thus the low frequency or direct current energization of indicator 21 is unimpeded, while substantially no high frequency leakage occurs.

In this manner we have provided an extremely simple and relatively frequency insensitive power measuring and indicating device which is responsive solely to power flow in a predetermined direction, and which may thereby indicate directly and monitor the power flow or standing wave ratio in an ultra high frequency energy conductor, for example, a wave guide, without requiring adjustment of any kind.

The structures of Figs. 3 and 4 are disclosed and claimed in our divisional application Serial No. 777,802 filed October 3, 1947, for High Frequency Measuring Apparatus.

It will be understood that where distances in wavelengths are given, the distances are measured within the guide, where generally the wavelength for a given frequency is longer than in free space due to the different velocities of propagation in the guide and in free space.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. High frequency apparatus comprising a first uniconductor wave guide adapted to be coupled to a source at one end and to a load at the other end, a second uniconductor wave guide extending along a portion of said first guide, a plurality of pin antennae couplings electromagnetically coupling said two guides together at points mutually spaced apart a distance substantially equal to a quarter-wavelength in said first guide at a frequency in the operating range of said apparatus, said pin antennae couplings all serving to transfer energy to said second wave guide in the same phase sense, and means terminating said second wave guide in substantially reflectionless manner at one end thereof, whereby the output derived from other end of said second wave guide is responsive to power flowing in said first wave guide only in one direction.

2. Apparatus as in claim 1, wherein said two wave guides have equal propagation constants.

3. Apparatus for indicating standing wave ratio, comprising a high frequency energy conductor, a pair of uniconductor hollow wave guides coupled to said conductor at opposite sides thereof, said wave guides having terminating impedances at their dissimilar ends so as to be respectively responsive only to waves traveling along said conductor in opposite directions, detectors respectively coupled to each of said wave guides adjacent the ends thereof away from said terminating impedances, and a ratio meter connected to said detectors to indicate the ratio of the incident and reflected power in said conductor.

WILLIAM W. HANSEN.
THEODORE MORENO.

REFERENCES CITED

The following references are of record in the file of this patent:

UNITED STATES PATENTS

| Number | Name | Date |
|---|---|---|
| 1,526,337 | Hartley | Feb. 17, 1925 |
| 1,590,420 | Chubb | June 29, 1926 |
| 1,602,882 | Chubb | Oct. 12, 1926 |
| 1,636,527 | Middlemiss | July 19, 1927 |
| 1,822,996 | Marick | Sept. 15, 1931 |
| 1,827,333 | Richardson | Oct. 13, 1931 |
| 2,140,364 | Lee | Dec. 13, 1938 |
| 2,151,118 | King et al. | Mar. 21, 1939 |
| 2,153,728 | Southworth | Apr. 11, 1939 |
| 2,305,952 | Cravath | Dec. 22, 1942 |
| 2,314,764 | Brown | Mar. 23, 1943 |
| 2,323,076 | Paul | June 29, 1943 |
| 2,323,128 | Hane | June 29, 1943 |
| 2,329,813 | Amsler | Sept. 21, 1943 |
| 2,365,218 | Roger | Dec. 19, 1944 |

FOREIGN PATENTS

| Number | Country | Date |
|---|---|---|
| 545,936 | Great Britain | June 18, 1942 |